United States Patent
Wang

(10) Patent No.: US 8,142,033 B2
(45) Date of Patent: Mar. 27, 2012

(54) PROJECTOR CAPABLE OF INDICATING INTERFACE STATE

(75) Inventor: Chun-Hsun Wang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 454 days.

(21) Appl. No.: 12/409,523

(22) Filed: Mar. 24, 2009

(65) Prior Publication Data

US 2010/0053473 A1    Mar. 4, 2010

(30) Foreign Application Priority Data

Sep. 2, 2008    (CN) .......................... 2008 1 0304341

(51) Int. Cl.
*G03B 21/00* (2006.01)
*H04N 5/64* (2006.01)
*G09G 5/00* (2006.01)
*G09F 13/14* (2006.01)
*G06F 3/00* (2006.01)

(52) U.S. Cl. ........ 353/122; 348/744; 345/156; 345/520; 715/700

(58) Field of Classification Search .................. 353/122; 348/744; 345/156, 520; 715/700
See application file for complete search history.

(56) References Cited

U.S. PATENT DOCUMENTS

| 5,859,623 A * | 1/1999 | Meyn et al. .................... 715/730 |
| 2002/0108108 A1* | 8/2002 | Akaiwa et al. ................... 725/30 |
| 2009/0036158 A1* | 2/2009 | Fujinawa et al. .......... 455/556.1 |
| 2009/0213067 A1* | 8/2009 | Do et al. ....................... 345/156 |

FOREIGN PATENT DOCUMENTS

| CN | 1991564 A | 7/2007 |
| CN | 101150695 A | 3/2008 |

* cited by examiner

*Primary Examiner* — Georgia Y Epps
*Assistant Examiner* — Magda Cruz
(74) *Attorney, Agent, or Firm* — Altis Law Group, Inc.

(57) ABSTRACT

A projector includes an interface unit, a control unit, and a projection unit. The interface unit includes a plurality of ports, each of which connects to a corresponding connector to allow the projector to connect to a corresponding signal source. The control unit identifies format of information read from the corresponding signal sources via the interface unit and identifies which port is connected. The projection unit projects a menu image, the menu image comprising a plurality of icons, each associated with a corresponding port and configured for indicating connection states of the corresponding ports.

8 Claims, 3 Drawing Sheets

PROJECTOR CAPABLE OF INDICATING INTERFACE STATE

BACKGROUND

1. Technical Field

The disclosure relates to a projector capable of indicating a connection state thereof.

2. Description of the Related Art

Some current projectors include a plurality of ports, capable of receiving corresponding connector types. This allows the projector to communicate with various signal sources. One of the challenges of utilizing such a projector occurs when the projector is connected to more than one signal source and a predetermined control must be activated to select from among the available signal sources, causing inconvenience. In addition, if the projector malfunctions while connected to multiple signal sources, it must be determined whether the fault lies with projector error or with one or more of the connections.

Therefore, it is desirable to provide a projector which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the projector. Moreover, in the drawings, like reference numerals designate corresponding parts throughout the view.

DETAILED DESCRIPTION OF THE EMBODIMENTS

Embodiments of the projector are described in detail here with reference to the drawings.

Figure 1:
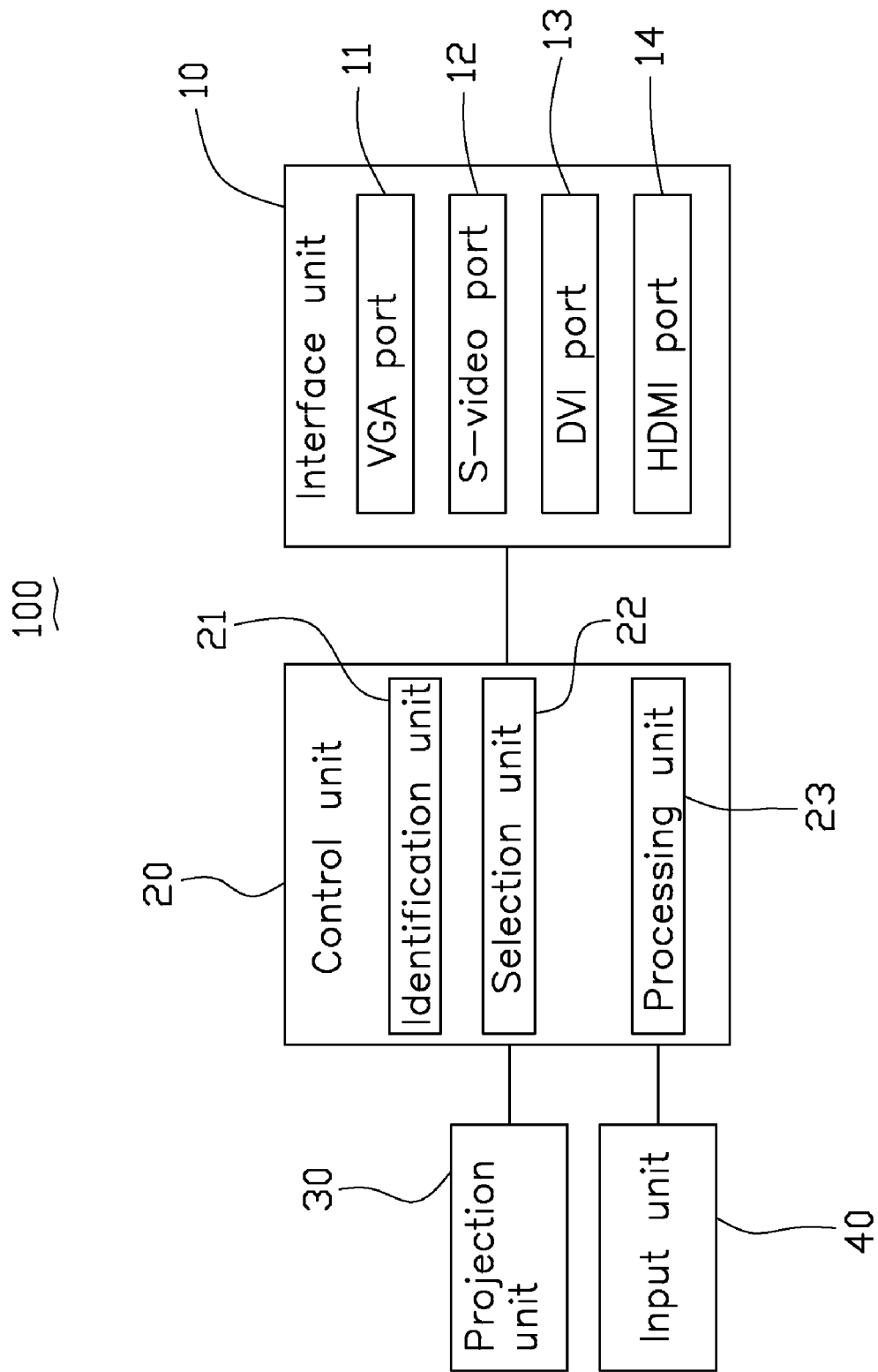
FIG. 1 is a block diagram of a first embodiment of a projector, according to the disclosure.

As shown in FIG. 1, a first embodiment of a projector 100 includes an interface unit 10, a control unit 20, a projection unit 30, and an input unit 40.

The interface unit 10 includes a number of ports, each of which connects to a corresponding connector to allow the projector 100 to accept input from a corresponding signal source. In an example, the interface unit 10 includes a Video Graphics Array (VGA) port 11, a Separate Video (S-video) port 12, a Digital Visual Interface (DVI) port 13, and a High Definition Multimedia Interface (HDMI) port 14. These ports can be connected to a VGA connector, an S-video connector, a DVI connector, and an HDMI connector, respectively. In detail, the VGA port 11 is configured for receiving an analog signal from an electronic device such as a personal computer. The S-video port 12 is configured for receiving an analog video signal that carries video data in luminance and color components. The DVI port 13 is configured for receiving a high quality digital signal. The HDMI port 14 is configured for receiving a digital signal in audio and video components.

The control unit 20 includes an identification unit 21, a selection unit 22, and a processing unit 23. The identification unit 21 is configured to identify format(s) of the information read from the signal source(s) via the interface unit 10 and thereby identify which port(s) is connected (activated). The selection unit 22 selects one of the signal sources to be projected in response to user input when more than one signal source is connected to the projector 100. The processing unit 23 is configured to process a signal from the selected signal source and convert the signal into displayable information.

The projection unit 30 projects the displayable information onto a projection screen, and can further project a menu image onto the screen upon initiation of the projector 100 or in response to the user input. The menu image is configured for showing a connection state of the interface unit 10.

Figure 2:
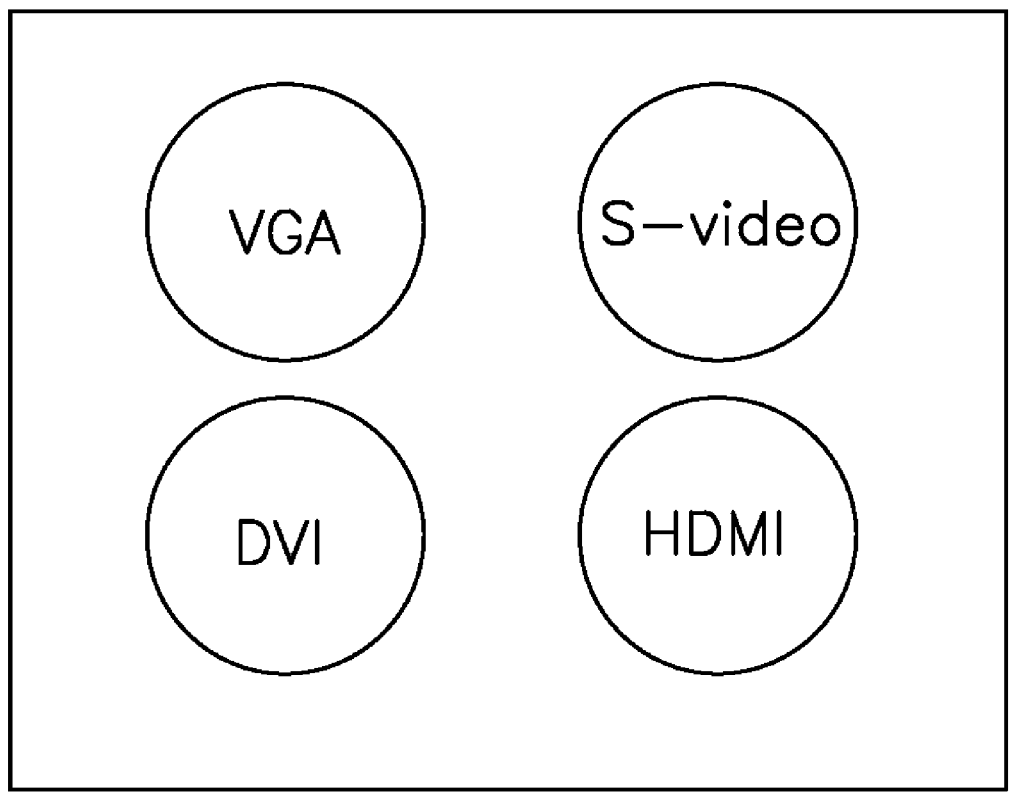
FIG. 2 is a schematic view of a projection screen of the projector of FIG. 1.

FIG. 2 depicts a projection screen 50 of an example. In this example, the menu image includes four icons: "VGA", "S-video", "DVI", and "HDMI". Each icon indicates the connection state of the corresponding port. The projection unit 30 can read the identification of the identification unit 21 and highlight those connected. For example, when the identification unit 21 identifies that the VGA port 11 and the HDMI port 14 (shown in FIG. 1) are connected to signal sources, the corresponding icons 'VGA' and 'HDMI' will be highlighted by the projection unit 30. Thereby, the user can acknowledge which port(s) is connected. When only one port is connected, the corresponding icon will be highlighted.

The input unit 40 is configured for receiving the user input.

Figure 3:
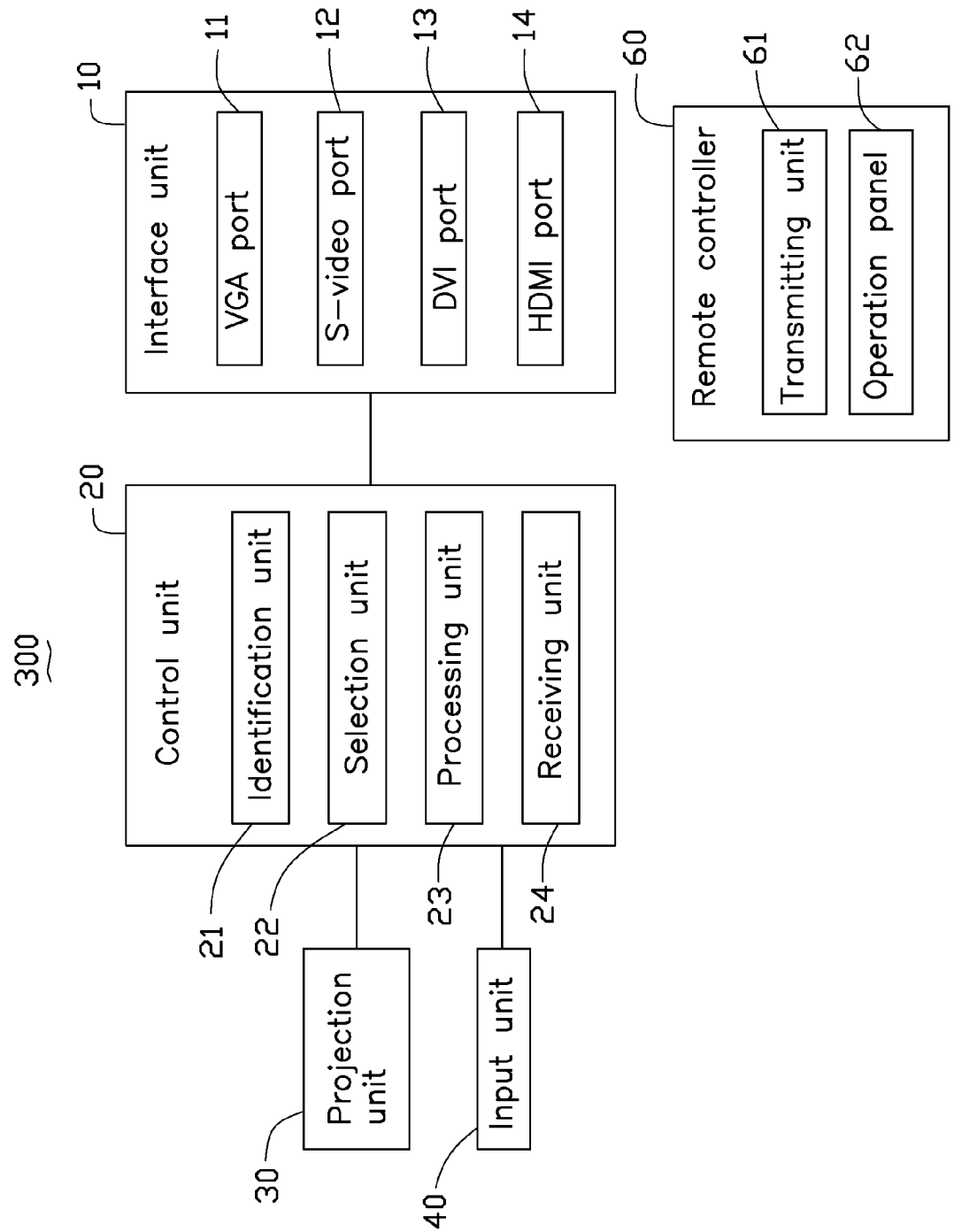
FIG. 3 is a block diagram of a second embodiment of a projector, according to the disclosure.

As shown in FIG. 3, a second embodiment of a projector 300 is shown, differing from the previous embodiment only in the inclusion of a remote controller 60 and a receiving unit 24 embedded in the control unit 20.

The remote controller 60 includes a transmitting unit 61 and an operation panel 62. The operation panel 62 has similar functionality to the input unit 40. Upon input of a desired selection, the receiving unit 24 receives the corresponding command through the transmitting unit 61 and transmits it to the processing unit 23.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projector comprising:
    an interface unit comprising a plurality of ports, each capable of connecting to a corresponding connector to allow input from a corresponding signal source, the ports comprising a Video Graphics Array port, a Separate Video port, a Digital Visual Interface port, and a High Definition Multimedia Interface port;
    a control unit capable of identifying information read from the corresponding signal sources via the interface unit and identifying which port is connected; and
    a projection unit configured for projecting a menu image, the menu image comprising a plurality of icons each associated with a corresponding port and configured for indicating a connection state of the corresponding ports.

2. The projector of claim 1, wherein the Video Graphics Array port is configured for receiving an analog signal from an electronic device.

3. The projector of claim 1, wherein the Separate Video port is configured for receiving an analog video signal that carries video data in separate luminance and color components.

4. The projector of claim 1, wherein the Digital Visual Interface port is configured for receiving a high quality digital signal.

5. The projector of claim 1, wherein the High Definition Multimedia Interface port is configured for receiving a digital signal that can transmit audio and video components.

6. The projector of claim 1, wherein the control unit comprises:

an identification unit configured to identify the format(s) of the information read from the signal source(s);

a selection unit configured to select one of the signal sources to be projected based on user input; and a processing unit configured to process a signal from the selected signal source and convert the signal into displayable information.

7. The projector of claim 6, further comprising a remote controller, wherein the control unit further comprises a receiving unit for interacting with the remote controller.

8. The projector of claim 6, further comprising an input unit connected to the control unit and configured for receiving user input.

* * * * *